United States Patent
Knight et al.

(10) Patent No.: US 9,322,912 B2
(45) Date of Patent: *Apr. 26, 2016

(54) TRANSPORTABLE RADAR UTILIZING HARMONIC DRIVES FOR ANTI-BACKLASH ANTENNA MOVEMENT

(71) Applicants: Michael Bruce Knight, Enterprise, AL (US); John Charles Fanning, Enterprise, AL (US); James Rogers Helvin, Ozark, AL (US); Mark Alan Jones, Daleville, AL (US); Norman Edwin Lawrence, III, Enterprise, AL (US); Damon Schmidt, Largo, FL (US)

(72) Inventors: Michael Bruce Knight, Enterprise, AL (US); John Charles Fanning, Enterprise, AL (US); James Rogers Helvin, Ozark, AL (US); Mark Alan Jones, Daleville, AL (US); Norman Edwin Lawrence, III, Enterprise, AL (US); Damon Schmidt, Largo, FL (US)

(73) Assignee: Enterprise Electronics Corporation, Enterprise, AL (US)

(*) Notice: Subject to any disclaimer, the term of this patent is extended or adjusted under 35 U.S.C. 154(b) by 314 days.

This patent is subject to a terminal disclaimer.

(21) Appl. No.: 13/655,443

(22) Filed: Oct. 18, 2012

(65) Prior Publication Data
US 2014/0009329 A1 Jan. 9, 2014

Related U.S. Application Data

(60) Provisional application No. 61/589,238, filed on Jan. 20, 2012.

(51) Int. Cl.
| G01S 13/95 | (2006.01) |
| G01S 13/02 | (2006.01) |
| G01S 7/03 | (2006.01) |
| G01S 7/288 | (2006.01) |
| H01Q 1/02 | (2006.01) |

(Continued)

(52) U.S. Cl.
CPC .............. *G01S 13/95* (2013.01); *G01S 7/032* (2013.01); *G01S 7/288* (2013.01); *G01S 13/02* (2013.01); *H01Q 1/02* (2013.01); *H01Q 3/08* (2013.01); *H01Q 19/13* (2013.01); *G01S 2007/027* (2013.01)

(58) Field of Classification Search
CPC ......... H01Q 3/08; H01Q 1/125; H01Q 19/13; G01S 13/951; G01S 2007/027
USPC .................. 342/26 D, 74; 343/766, 757, 915
See application file for complete search history.

(56) References Cited

U.S. PATENT DOCUMENTS

| 5,453,753 A | 9/1995 | Cosenza et al. |
| 5,990,843 A * | 11/1999 | Knapp ........................ 343/765 |

(Continued)

FOREIGN PATENT DOCUMENTS

JP 0851311 A 2/1996

*Primary Examiner* — John B Sotomayor
*Assistant Examiner* — Marcus Windrich
(74) *Attorney, Agent, or Firm* — The Gache Law Firm, P.C.; Russell C. Gache

(57) ABSTRACT

A transportable weather radar having radar electronics functionally located above the elevational joint and a frame superstructure rotationally connected to the elevational joint onto which is mounted a parabolic radar antenna adapted for Doppler weather radar use. The radar has a rotational drive assembly mounted below and supporting the elevational joint and a harmonic drive unit positioned inside the elevational joint so that the antennae may be rotated without significant backlash during rotational changes. A hollow center in the rotational joint allows for the passing of electronics cable through the middle of the joint and down through rotating assemblies and to electronics in or adjacent to the radar pedestal.

29 Claims, 16 Drawing Sheets

(51) Int. Cl.
  *H01Q 3/08* (2006.01)
  *H01Q 19/13* (2006.01)
  *G01S 7/02* (2006.01)

(56) References Cited

U.S. PATENT DOCUMENTS

| | | | |
|---|---|---|---|
| 6,396,235 B1 | 5/2002 | Ellington et al. | |
| 6,462,718 B1 * | 10/2002 | Ehrenberg et al. | 343/880 |
| 6,531,992 B1 * | 3/2003 | Ehrenberg et al. | 343/912 |
| 7,183,966 B1 * | 2/2007 | Schramek et al. | 342/53 |
| 7,663,565 B2 * | 2/2010 | Son et al. | 343/765 |
| 7,671,785 B1 * | 3/2010 | Walker | 342/26 D |
| 7,719,458 B1 * | 5/2010 | Walker | 342/26 D |
| 7,760,129 B1 * | 7/2010 | Knight | 342/26 D |
| 7,791,553 B2 * | 9/2010 | Conrad | 343/761 |
| 7,852,274 B2 * | 12/2010 | Madden et al. | 343/713 |
| 8,235,324 B1 * | 8/2012 | Birch et al. | 244/17.25 |
| 2003/0210174 A1 | 11/2003 | Nakamura | |
| 2008/0084357 A1 * | 4/2008 | Smeltzer | 343/757 |
| 2011/0291878 A1 * | 12/2011 | McLaughlin et al. | 342/26 D |
| 2012/0001816 A1 | 1/2012 | Blaney | |

* cited by examiner

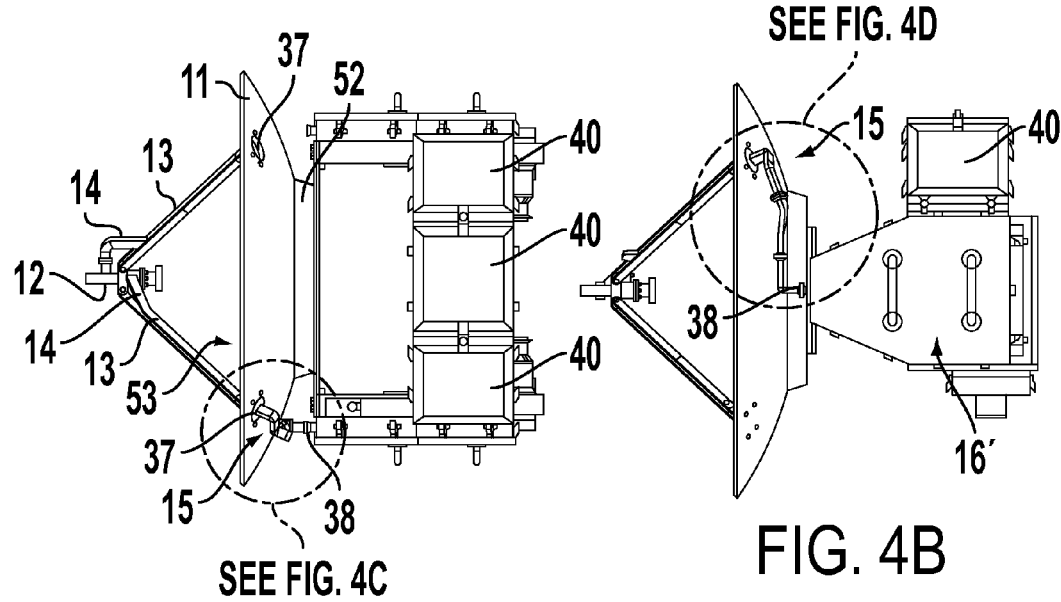
FIG. 4A
FIG. 4B
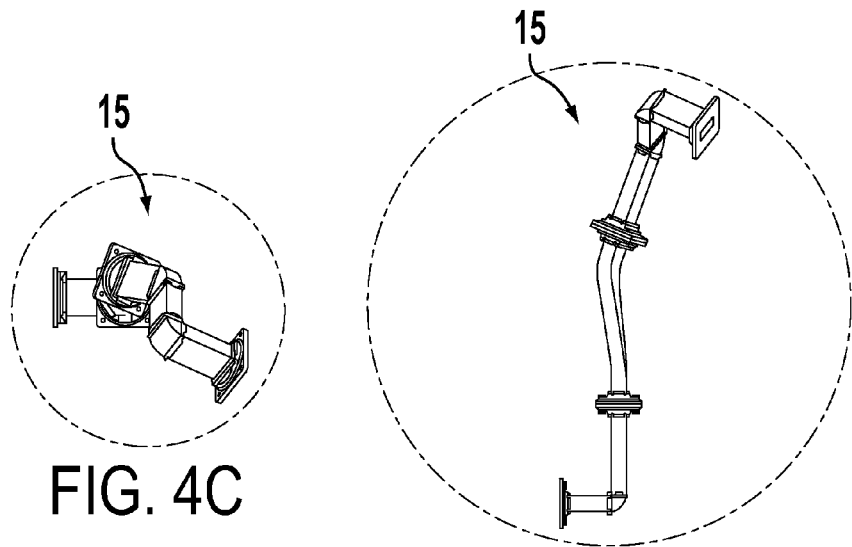
FIG. 4C
FIG. 4D

TRANSPORTABLE RADAR UTILIZING HARMONIC DRIVES FOR ANTI-BACKLASH ANTENNA MOVEMENT

FIELD OF THE INVENTION

The present invention relates generally to radars. More particularly, the invention relates to Doppler radars having all necessary electrical transmission and reception components located above an elevational positioning system. In even greater particularity the invention relates to weather radars utilizing harmonic drives to position the antenna assembly.

SUMMARY OF THE INVENTION

A transportable weather radar, including radar electronics functionally located above the elevational joint, a frame superstructure rotationally connected to the elevational joint, a rotational drive assembly mounted below and supporting the elevational joint and drive assembly upon which the radar antenna is mounted, and a harmonic drive unit positioned within the elevational joint so that the antennae may be rotated without significant backlash during rotational changes. An azimuthal drive assembly having a hollow center also includes a harmonic drive assembly for azimuthal rotation of the antenna assembly.

BRIEF DESCRIPTION OF THE DRAWINGS

A radar incorporating the features of the invention is depicted in the attached drawings which form a portion of the disclosure and wherein:

FIG. 4A is a superior view of the radar showing the portion of the radar components located above the azimuthal juncture;

FIG. 4B is an elevational view from the left side of the radar showing the portion of the radar components located above the azimuthal juncture;

FIG. 4C is a superior perspective view of the left wave guide tube connecting the left transceiver to the radar antenna;

FIG. 4D is another perspective view of the left wave guide tube connecting the left transceiver to the radar antenna;

FIG. 7A is an inset perspective view of the assembled actuator driven elevational joint assembly detached from the elevational drive assembly case;

FIG. 8A is an inset perspective view of the passive, non-driven assembled elevational joint assembly detached from the elevational drive assembly case;

DESCRIPTION OF THE PREFERRED EMBODIMENTS

Figure 1:
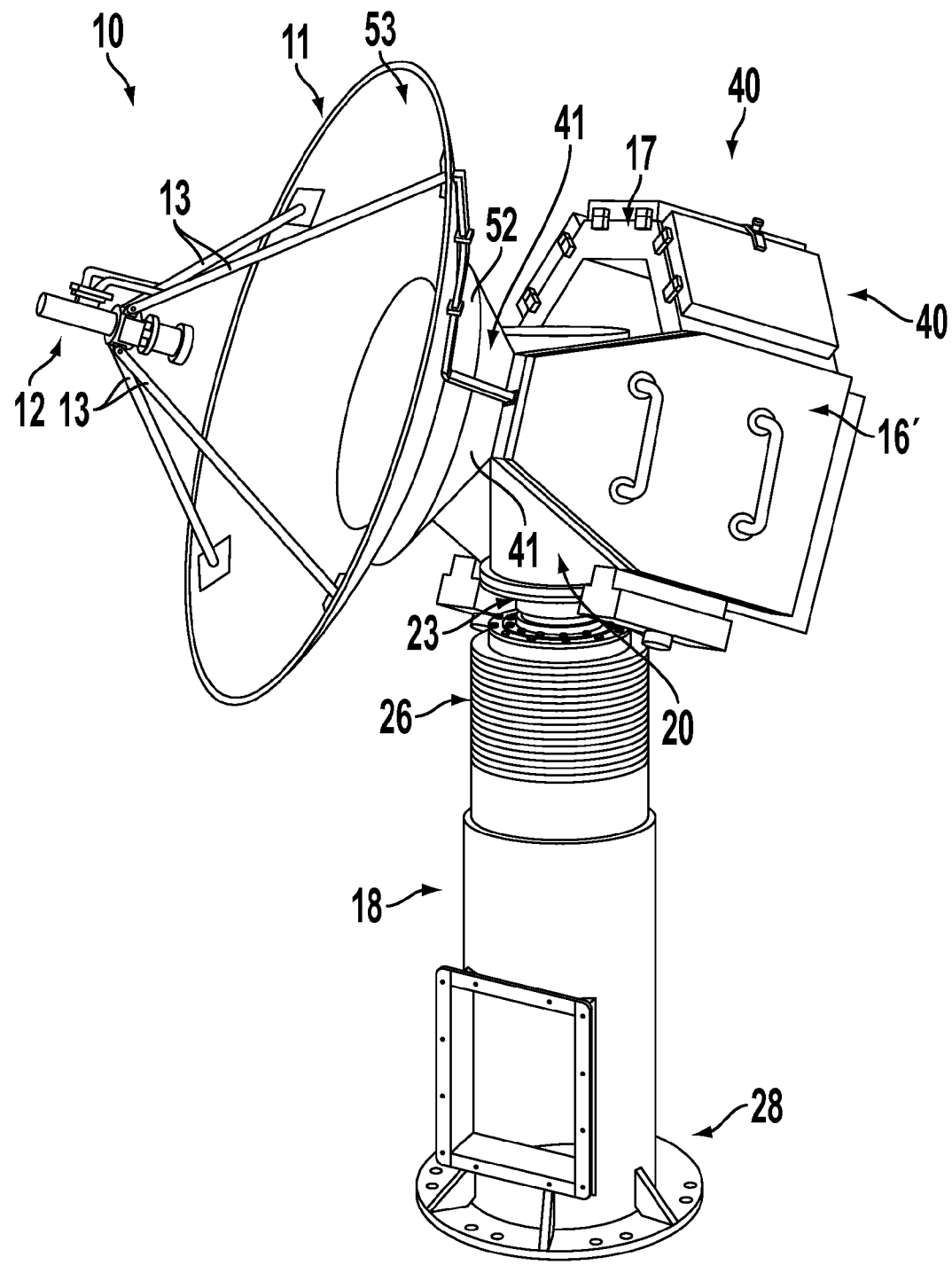
FIG. 1 is a perspective view of the entire radar in its operational orientation.

Referring to the drawings for a better understanding of the function and structure of the invention, it may be seen in FIG. 1 that the radar 10 includes a parabolic antenna 11, and an orthomode feed horn 12 positioned within the center of the parabolic antenna 11. The feed horn 12 is spaced from and supported above the antenna surface with four support brackets 13 that position the feed horn at an optimal transmission and reception point relative to the antenna surface 53. A pair of wave guides 14 are positioned along and supported by the top two brackets 13, thereby connecting the horizontal and vertical chambers in the feed horn 12 with electronics bays 16 and 16' through an aperture formed within the antenna surface as shown. A pair of companion wave guides 15 bridge the antenna surface aperture on each side front wave guide with the electronics bays. These bays 16 are "saddlebag" subassembly modules 16 that hold electronics for the transmission, reception, and processing of radar energy components, and are supported by a super structure frame 17 of the radar 10. These subassemblies are bolted onto the frame 17 and may be removed for servicing or replacement as needed. Three additional compartments 40 are located on the superior surface of the frame 17 and can also hold electronics as needed.

Figure 2:
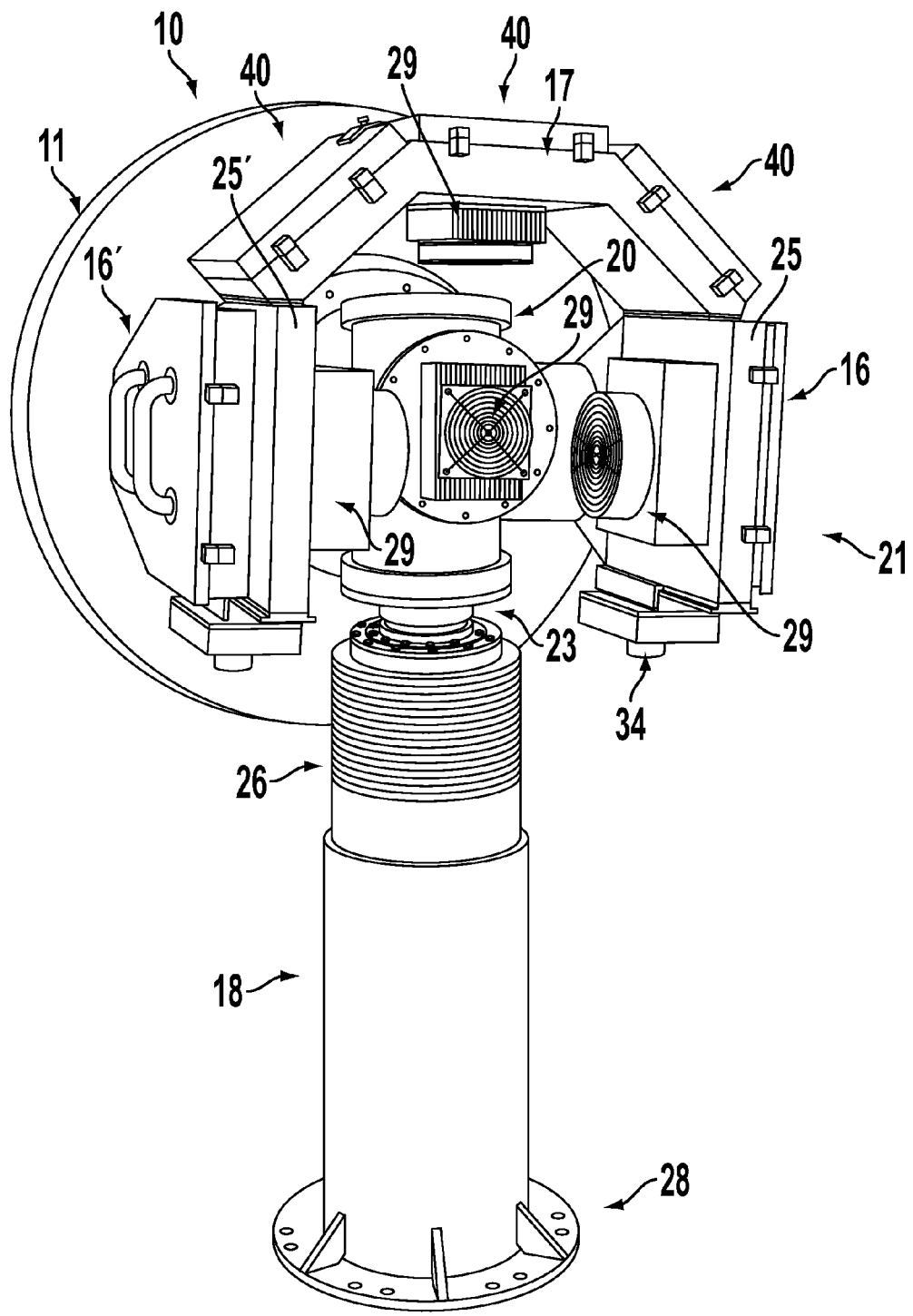
FIG. 2 is a rear perspective view of the radar in its operational orientation.

As may be seen in FIG. 2 in conjunction with FIG. 1, the antennae 11 and frame super structure 17 are mounted on an elevational drive subassembly 20 such that the super structure 17 is able to rotate up and down along with the attached antenna 11 through a range of approximately −12 degrees to 109 degrees, relative to a horizontal plain supporting the radar base 28. The super structure 17 includes welded side support panels 25, 25' rotationally supported by an opposing pair of elevational joints 22, 22', the left side of which 25' is driven and controlled by a harmonic drive positioned within the drive subassembly 20, and the right side of which passively rotates in response to movement of the harmonic drive in the left side. The elevational drive assembly is rotationally supported by rotational drive system 26 that sits upon and is supported by a pedestal 18 and metal base 28. The base 28 is welded to the lower portion of the pedestal 18 and may be bolted to another support structure (not shown) such as a mobile trailer assembly to allow for easy mobility and transport of radar 10, or a stationary concrete base with mounting bolts or lagging screws to form a fixed station.

Figure 3:
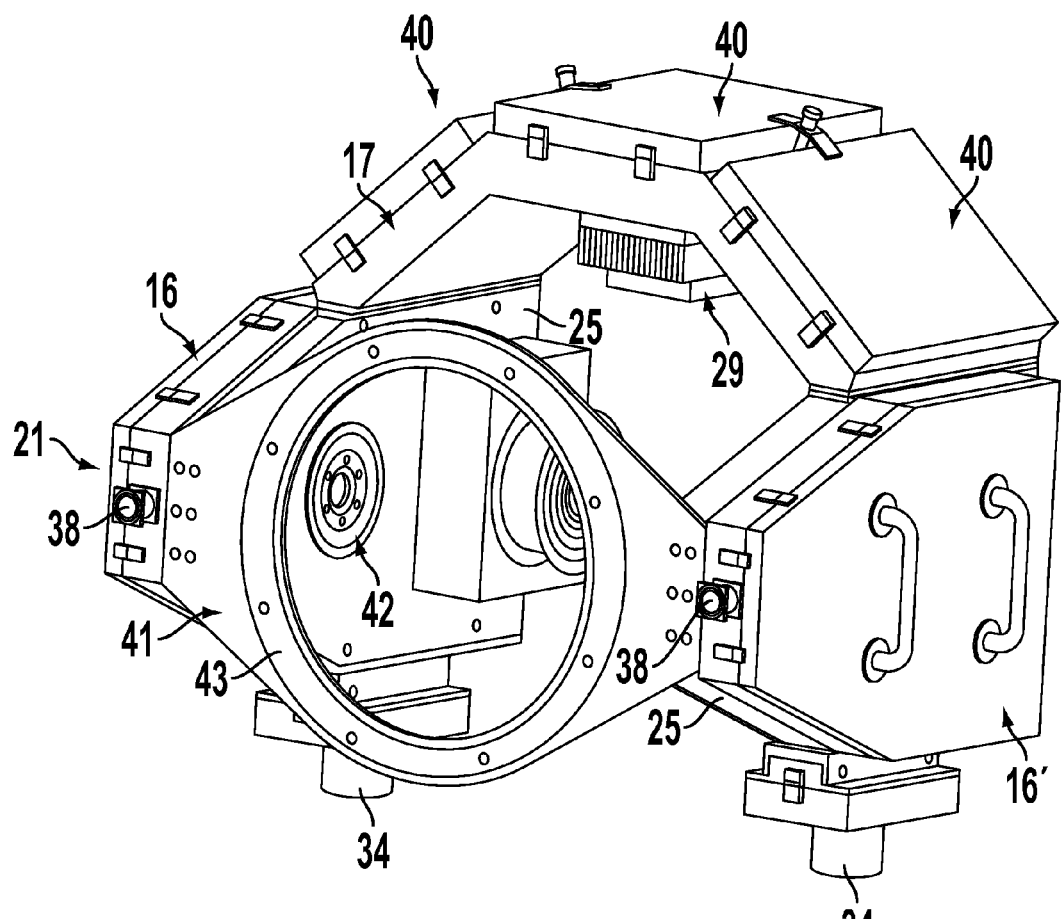
FIG. 3 is perspective view of the superstructure with electronic bay assemblies attached, but the radar antenna and wave guides removed.

With additional reference to FIG. 3, electronics are housed within the saddle-bag compartments 16 bolted onto each super structure side panel 25, 25' and are cooled through a series of fluid tubes that wind through each compartment to pick up heat from the electrical systems and pass that heat to a an assembly of cooling components 29 positioned below the super structure 17. Each assembly 29 includes a Peltier cooling plate 31, a heat exchanger 32, and a cooling fan 30 mounted together to facilitate removal of heat within the superstructure enclosure. As may be noticed, a plurality of these cooling assemblies 29 are positioned at various points on the superstructure, such as on the front and back of the elevational drive assembly 20, and on the interior surface of the compartments 16.

Also supported by the superstructure is three additional compartments 40 in which various electronics may be held. Preferably, the center compartment 40 holds an IFD digitizer (see FIGS. 15 and 16). To the right or left of the center compartment, one down angled compartment 40 may hold a pedestal controller and the other may hold temperature controllers.

Below each side subassembly module 16, a pump 34 is bolted to the lower surface of the module 16 to drive coolant fluid behind each module 16 and within superstructure 17 side panels 25, and back to each cooling assembly 29. Further, pump 34 may also pump fluid to heat exchanger within each upper compartment 40 to cool electronics within these compartments with temperature controllers in compartment 40 controlling pump 34 in accordance with thermostatic settings selected by the user. Preferably. AN (Aeronautical-Navy) fittings and tubing will be used as a fluid conduit from pump 34 to various heat exchangers within each module. This arrangement forms a cooling plenum for electronics housed in modules 16, 16', electronics in compartments 40, and the drive actuator that controls the elevational movement of the frame 17. Such active cooling, allows for the positioning of relatively high powered radar transmission electronics within compartments 16 and 40, while preserving relatively easy maintenance access.

Spanning the front edges of side panels 25, 25' an antenna mounting frame 41 rigidly supports antenna 11 by bolting the antenna onto a circumferential recess 43 formed in antenna frame 41 as shown. Antenna 11 includes an integral base portion 52 that extends rearward from the inner parabolic reflectivity surface 53 on the antenna to provide a flat base sized to match the recess 43 and for rigidly affixing the rear of the antenna to the frame 41 with bolts.

Referring now to FIGS. 4A-4D, it may be seen that a pair of front wave guides 14 are positioned onto the interior of antenna 11 and supported by brackets 13. A pair of apertures 37 are positioned in the antenna 11 to allow for the fitting of one end of each front wave guide 14 to the antenna while allowing radar signals to traverse the antenna for transmission and reception from the orthomode feed horn 13. A corresponding rear pair of wave guides 15 connect the rear most portion of wave guide 14 at aperture 37 to wave guide transmission port 38 in module 16. As shown in FIG. 4C-4D, rear wave guides 15 are shaped to facilitate transmission and reception of radar waves to and from transceiver electronics housed by modules 16 via antenna 11. Further discussion regarding the construction and positioning of wave guides as used in radar 10 shall be omitted as the use and construction of wave guides are known in the industry and not necessary for a complete understanding of the herein described invention.

Figure 5:
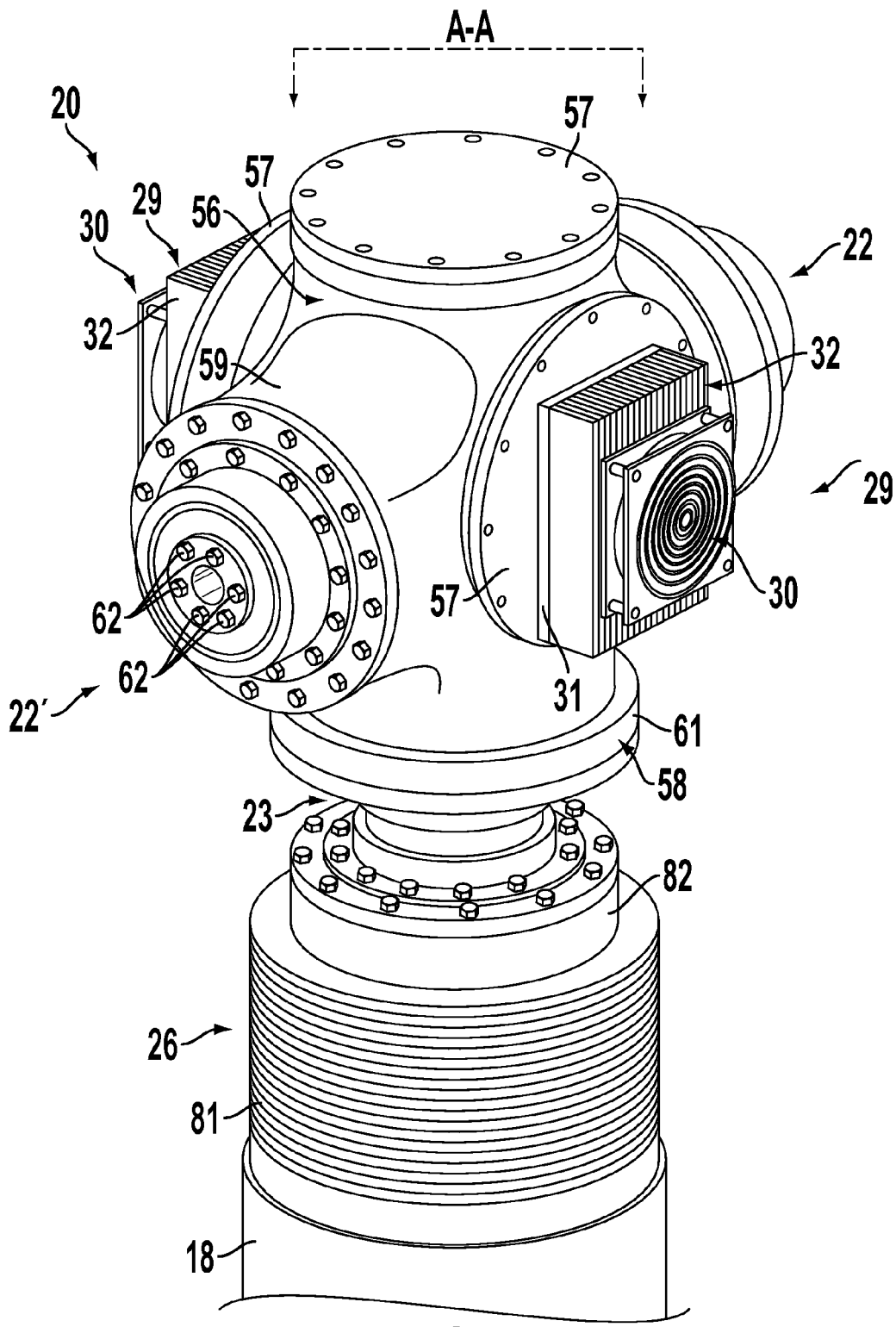
FIG. 5 is a perspective view of the elevational drive assembly mounted onto the rotational drive assembly with the frame superstructure and radar antenna removed.

As shown in FIG. 5, elevational drive assembly 20 is rotatably mounted onto the rotational drive assembly 26. The elevational drive assembly 20 includes rotating elevational joints 22 on each side axially aligned to each other through an internal drive system, as will be further discussed. The assembly's case 56 serves as a vertical support frame between the rotational drive assembly 26 and frame superstructure 17 and typically may be formed from a forged piece of steel, or precision machined from a solid piece of steel. The hollow interior of case 56 holds elevational drive components and cooling systems. Case 56 includes formed side extensions 59 sized such that the exterior mounting bolts 62 on each elevational joint 22 match mounting holes 42 formed in the lower support panels 25, 25' of superstructure 17. For cooling, case 56 includes three metal access plates 57 bolted onto case 56 onto which two have cooling assemblies 29 mounted thereon as shown. The lower end 58 of assembly 20 includes a collar member 61 through which lower end 58 connects to and is supported by rotational drive system 26.

Figure 6:
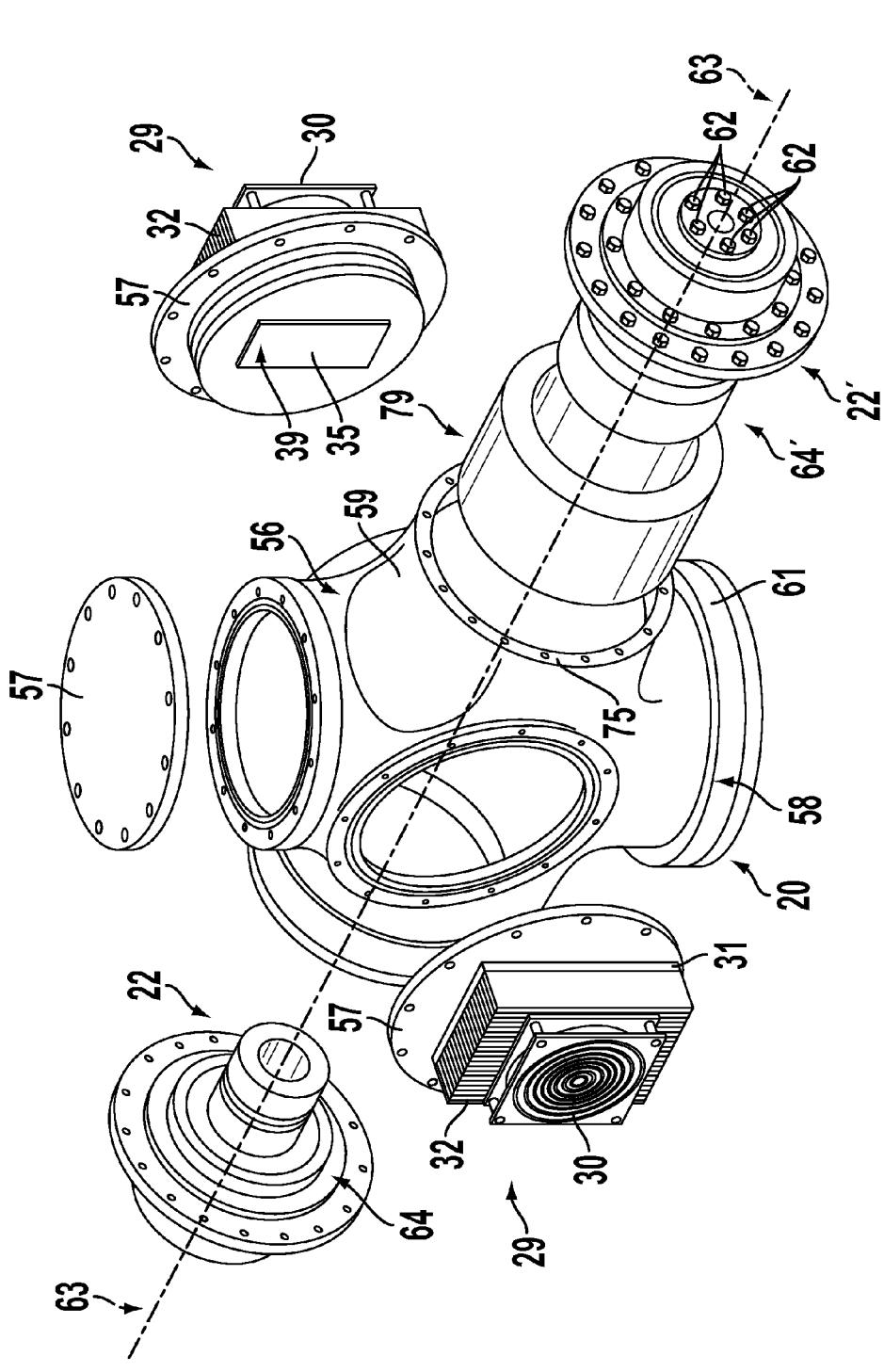
FIG. 6 is an exploded perspective view of the elevational drive assembly showing Peltier coolers on the front and back sides of the assembly.

Referring now to FIG. 6, it may be seen that Peltier cooling plate 31 includes a back portion surface 35 that extends through an aperture 39 formed in the maintenance access plates 57, thereby providing an optimal cooling surface on the inside of drive assembly 20. As may be understood, surface 35 provides a heat transfer pathway from copper tubes positioned adjacent to surface 35 containing coolant that can be circulated within drive assembly 20 to remove heat from critical internal components. In addition, electronic components may be mounted on or in proximity to surface 35 for cooling.

Elevational joints 22, 22' consist of rotational assemblies 64 and 64' axially aligned to one another along axis 63 and rotationally locked relative to one another via frame superstructure 17. Rotational assembly 64 is passive, providing rotational support in identical angular relation to rotational assembly 64'. Rotational assembly 64' includes a drive actuator system and also includes a cooling jacket 79 that continually supplies cooled water through radial copper tubing wound within jacket 79 and surrounding a drive motor. An internal pump (not shown) pumps liquid coolant from each jacket 79 to the aforementioned Peltier cooling surface 35 for the dissipation of heat from drive assemblies 64 through cooling assemblies 29. While currently coiled copper tubing is preferred, the inventors contemplate use of a coolant reservoir held by jacket 79 to provide a larger cooling surface area and enhanced heat removal.

Figure 7:
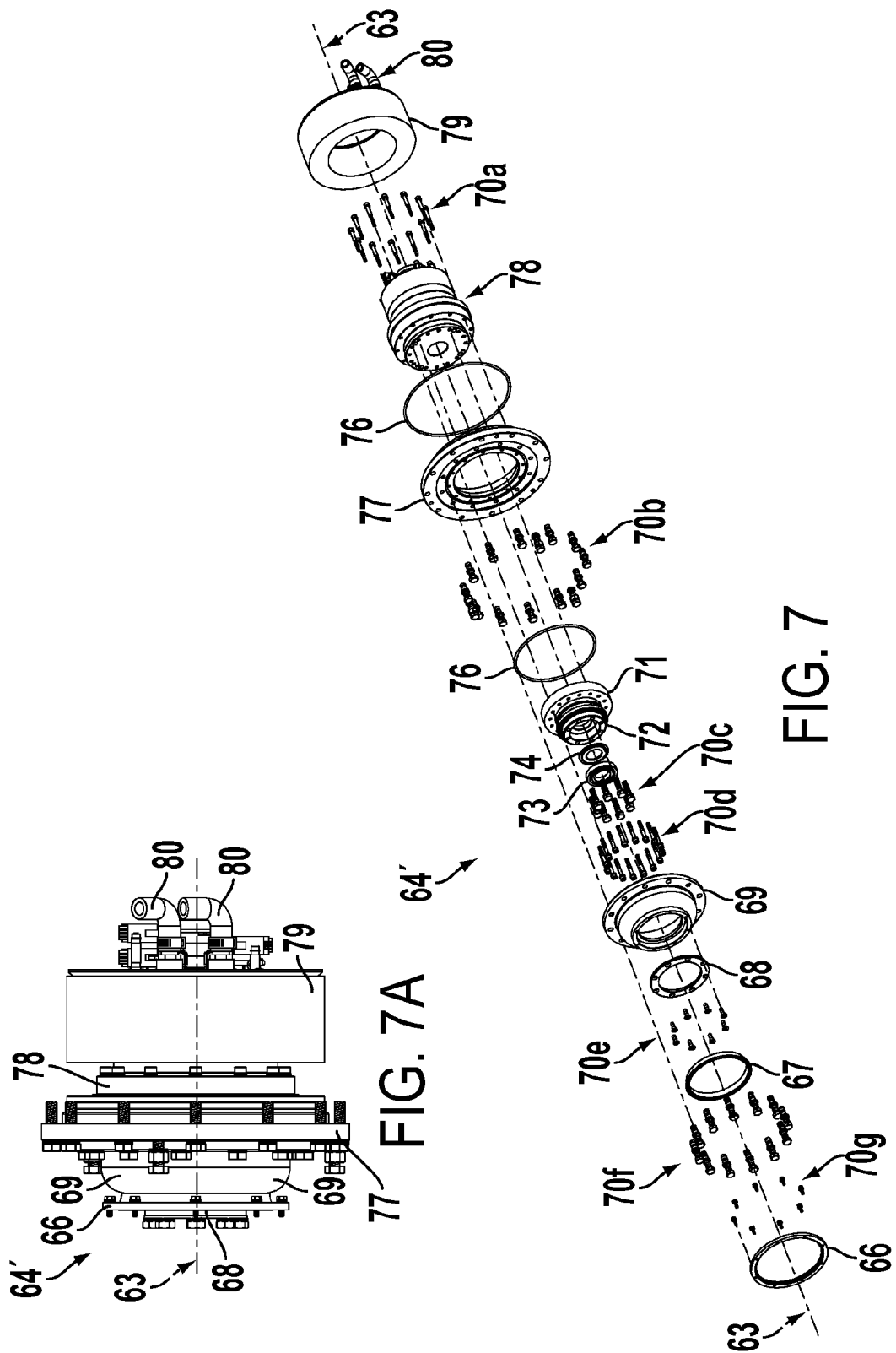
FIG. 7 is an exploded perspective view of the actuator driven elevational joint assembly.

Referring now to FIGS. 7 and 7A, it may be seen that rotational assembly 64' includes a series of gaskets, O-rings, and clamping plates through which a drive actuator 78 may produce rotational force. Drive actuator 78 preferably consists of a hollow shaft, strain wave actuator, such as a harmonic drive offered by Harmonic Drive Technologies (aka Harmonic Drive, LLC) located in Boston, Mass. under their SHA model series. Sensors on the interior of the drive actuator (not shown), monitor the drive shaft rotation speed, direction, and angular position so that precise control of the output shaft, and thereby the rotation of joint 22 joint superstructure 17 and antenna 11, may be achieved. Since rotational movement between joints 22 and 22' are locked, movement by actuator 78 causes responsive and synchronized rotational movement in joint 22.

For the present disclosure, the term "Harmonic Drive" is utilized as the generic name for a "strain wave actuator" known in various industries and developed in the 1950s. Stain wave actuators have three primary parts: a wave generator, a flexspline and a circular spine. The wave generator is an assembly of a bearing and a steel disk called a wave generator plug. The outer surface of the wave generator plug has an elliptical shape that is machined to a precise specification. A specially designed ball bearing is pressed around this bearing plug, causing the bearing to conform to the same elliptical shape as the wave generator plug. The flexspline is a thin-walled steel cup with teeth machined into the outer surface near the open end of the cup. The large diameter of the cup allows it be radially compliant, yet remain torsionally stiff, and it has a rigid boss at one end to provide a rugged mounting surface. During assembly, the wave generator is inserted inside the flexspline in the same axial location as the flexspline teeth. The flexspline wall near the brim of the cup conforms to the same elliptical shape as the bearing, effectively creating an elliptical gear pitch diameter on its outer surface. The flexspline has two fewer teeth than the circular spline so that as the wave generator rotates one revolution, the flexspline and circular spline shift by two teeth, creating a "wave-like" (hence the name) motion to the flexspline. Therefore, as the wave generator is rotated by the primary power source (typically an electrical motor or servo), the generator imparts a rotational force to any connected external element via the flexspline member in a rotational direction opposite to the primary power source The unique kinematics of this arrangement allows the teeth of a harmonic drive gear to be engaged on both sides of the tooth flank, providing up to 30% of the gear teeth to be engaged during all rotations of the flexspline, and a high ratio of force and rotational movement between the flexspline and the power source. Conventional radar designs use conventional motor gearing to move antennas into a desired position in which about 3-4% of the gear teeth are meshed, at most. But, this low meshing gearing often leads to unwanted movement due to differences between gear tooth space and gear tooth width, called "backlash." Backlash is unwanted rotational wobbling that can cause unplanned torsional movement within a multi-orbital gearing arrangement. This condition can further increase over time as the gear teeth wear with age. However, because harmonic drives have a high degree of gear meshing, they cause no backlash during movement. This leads to smooth and well controlled sky scans by a radar antenna assembly, among other advantages such as highly precise and trackable antenna positions and large power leveraging of small motor or servos within the radar assemblies. The present invention integrates harmonic drives in key rotational assemblies and couples those drives with output elements that enhance the anti-backlash characteristics of such drives as will be described.

Drive actuator 78 is bolted 70*d* to output hub 71 through stationary support plate 77 to which actuator case is bolted 70*a*, and the actuator 78 is atmospherically isolated through O-rings 76. Ball bearing 73 and integrated bearing/output drive tube 72 support drive shaft spacer 74 such that hub 71 and output drive tube may rotate freely, and to which depending superstructure panels 25' may be fixed via exterior bolts 70*c*. End cap 69 is bolted 70*f* to support plate 77 and holds output seal clamp 68 with bolts 70*e*. Ring seal 66 presses labyrinth seal 67 against claim 68 with bolts 70*g* so that exterior atmosphere is prevented entry into the interior of elevational drive assembly 20.

Figure 8:
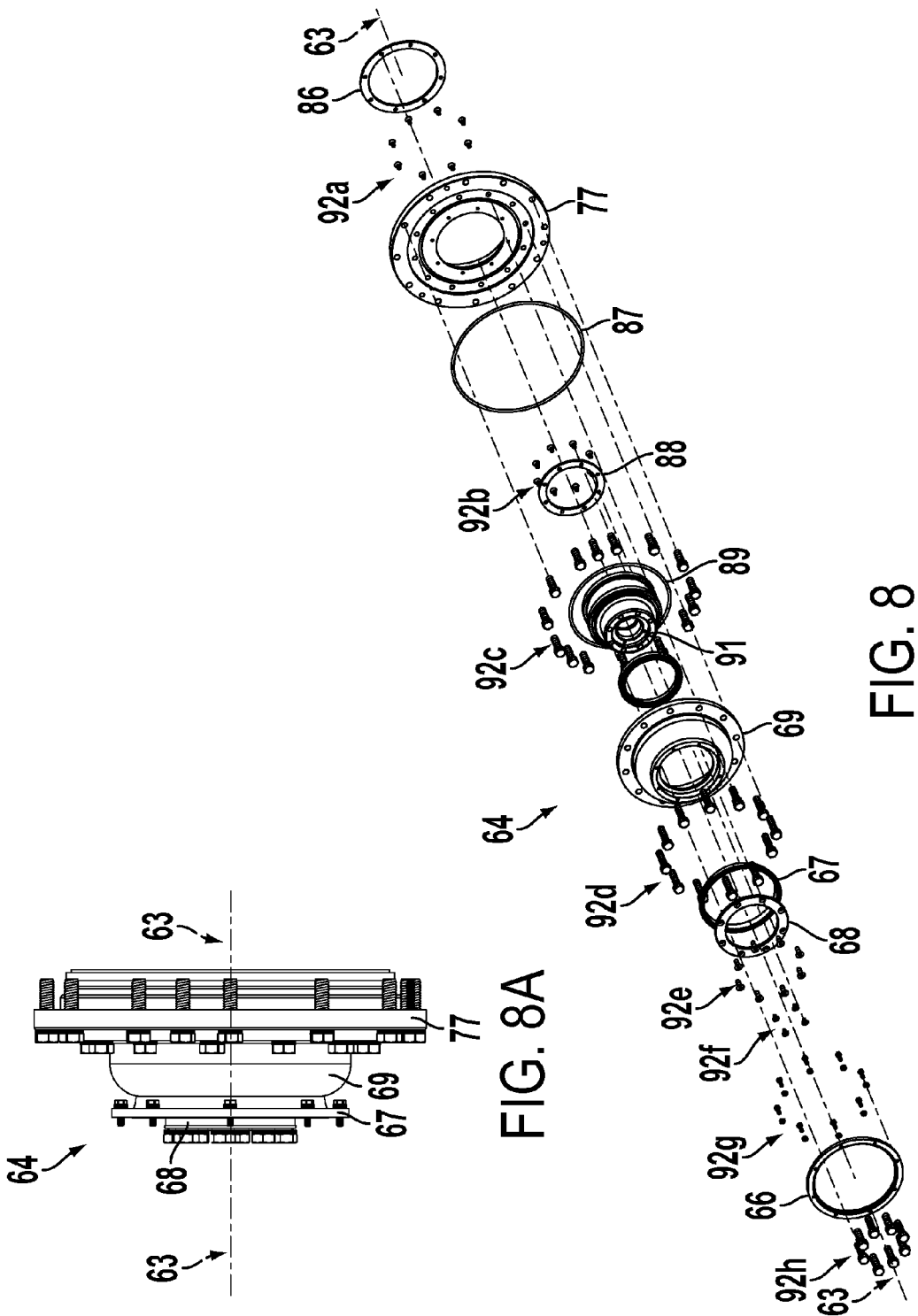
FIG. 8 is an exploded perspective view of the passive or non-driven elevational joint assembly.

Rotational assembly 64 has a structure similar to assembly 64', but omits drive actuator and cooling jacket elements 78 and 79. As shown in FIGS. 8 and 8A, instead of the rotational hub/bearing being bolted to an actuator, rotational hub/bearing 91 has an outer circumferential margin bolted to the interior of end cap 69 and support plate 77. As in assembly 64', assembly includes clamps, O-rings, and gaskets to environmentally isolate the interior of the elevational drive assembly 20 from the outside environment as may be seen. Assembly 64 omits additional ball bearing 73 and spacer 74, since assembly 64 does not include a drive tube as in the opposing assembly 64'.

Figure 9:
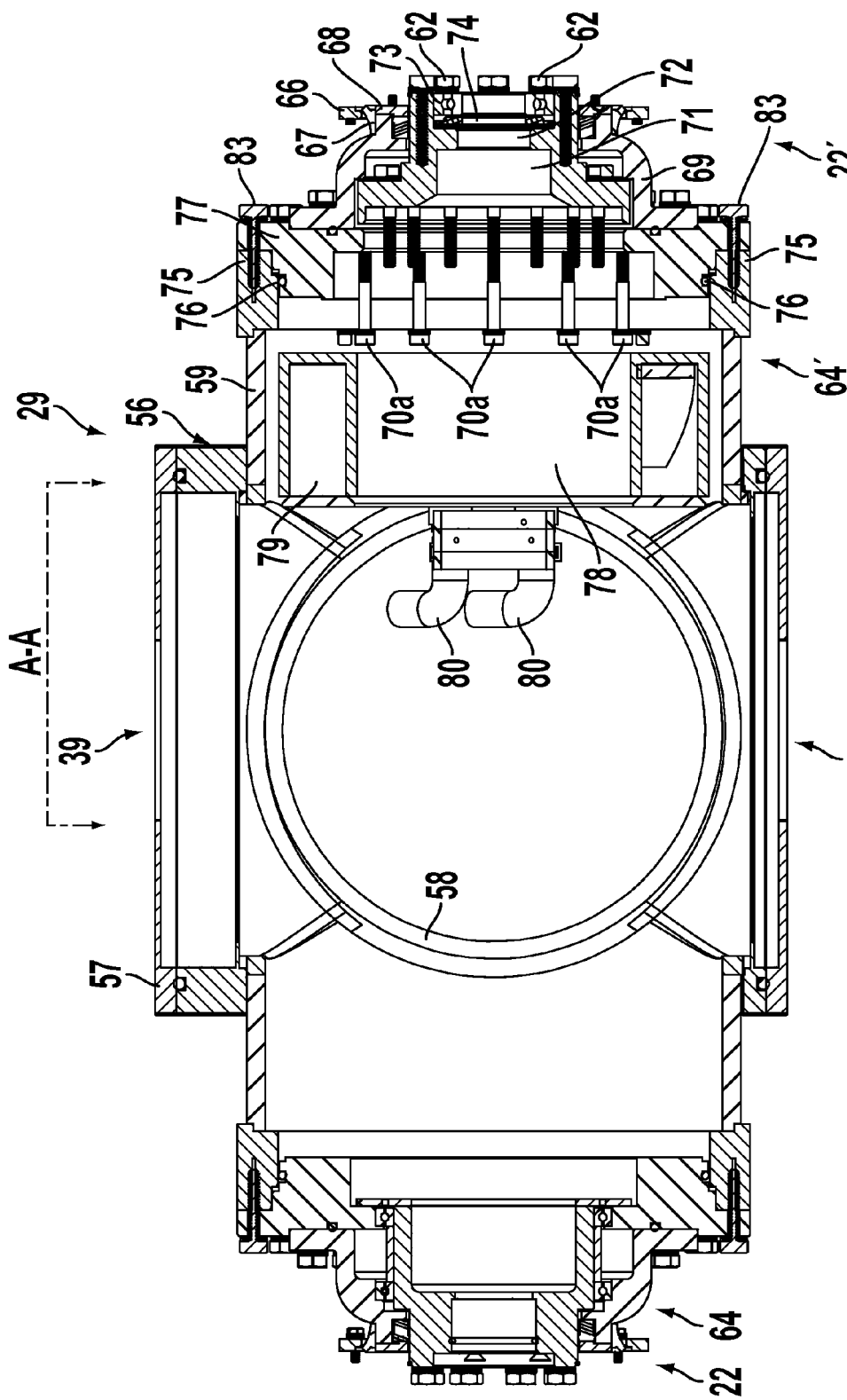
FIG. 9 is a horizontal section view taken along lines A-A in FIG. 6 of the elevational drive assembly.

As seen in FIG. 9, case 56 is sized to accept drive assemblies 64 and 64' in snug precision within case extensions 59. After insertion within extension 59, each drive assembly 64, 64' is tightly affixed to a circumferential flange 75 by bolting 83 stationary support plate 77 to flange 75. In addition, the cooling jacket 79 that surrounds actuator 78 in assembly 64' is positioned within case 56 in tight conformity thereof to provide stability and isolated cooling. Inlet and outlet ends of tubing 80 (not shown) within jacket 79 connect to a circulating pump (see FIGS. 2-3, pump 34) to circulate coolant to and from Peltier plates 35 and the cooling jacket 79 for continuous heat removal from drive actuator 78.

As may be understood, drive assemblies 64 and 64' are hollow, including end caps 69 on each end that bolt on to side panel attachment points 42. Hence, bolts 62 that secure the end cap 69 on each end to the frame superstructure 17 form an open column for wires and cables to traverse through each assembly 64, 64' and up and into sealed side panels 25 where electrical access may be obtained for electronics held in electrical modules 16. Preferably, power and positional signal conductors traverse the center of the non-driven or passive assembly 64, and a fiber optic cable for communicating digitized radar data signals traverses driven assembly 64'.

Figure 10:
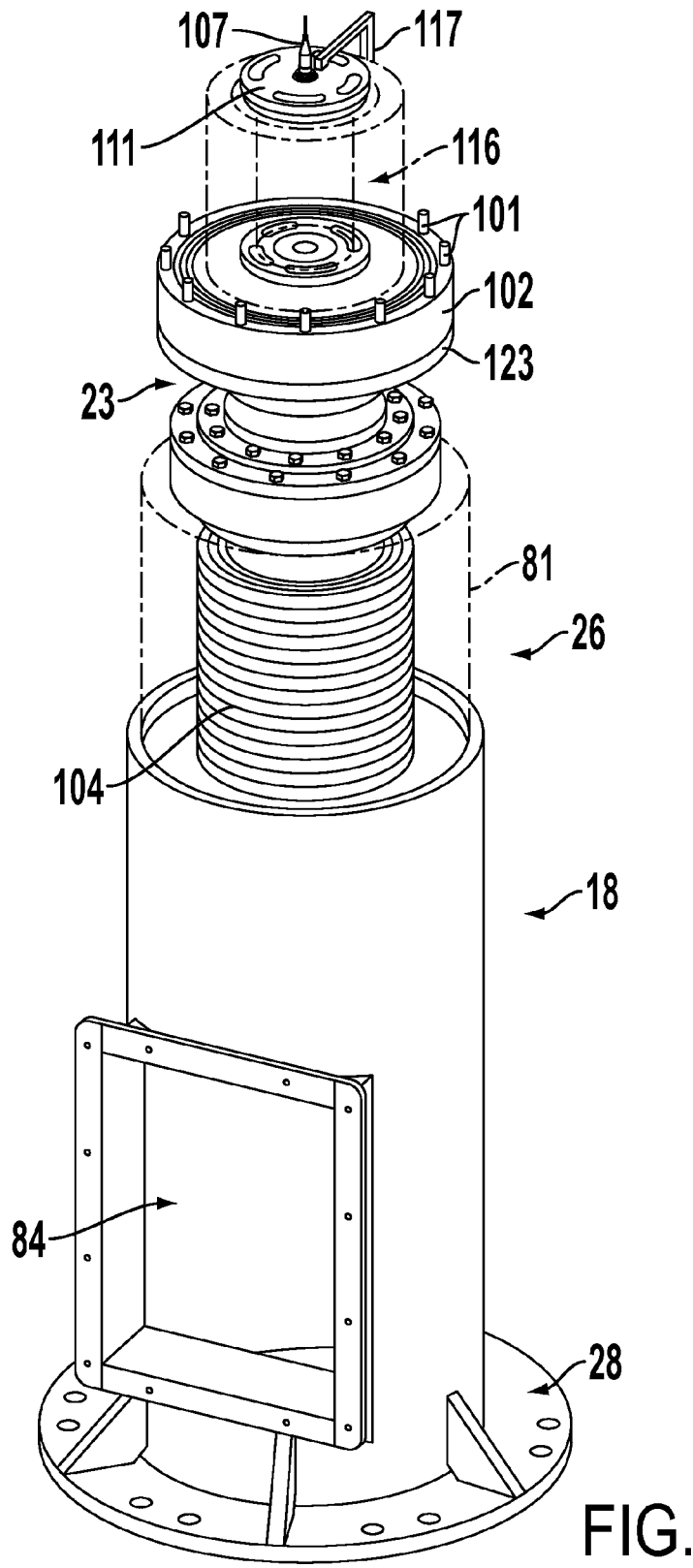
FIG. 10 is a perspective view of one embodiment the pedestal with the azimuthal drive assembly mounted upon the pedestal.

Referring now to FIG. 10, it may be seen that elevational drive assembly 20 is rotationally supported upon rotational drive assembly 26. The lower portion 58 of the elevational drive assembly 20 includes a mounting collar 61 having a circumferential arrangement of threaded apertures (not shown) that are positioned to receive a series of bolts 101 extending upwards from a support band 102. Rotary joint capsule 116 is supported within support band 102 and extends into and held within the lower end 58 of elevational assembly 20 when mounting collar 61 is bolted onto band 102. The rotational drive case 81 holds a rotational actuator 103 and cooling jacket 104 seated atop pedestal 18. Pedestal 18 includes maintenance access way 84 and has its lower end welded onto pedestal support base 28. A NEMA type enclosure may be bolted onto the circumferential flange of access way 84 to house various types of additional electronics. For example, network routers, power supply electronics, and pedestal electronics (i.e. a controller for elevational and rotational assemblies) might all be housed within a NEMA enclosure as an alternative to other locations like compartments 40 on superstructure 17.

Figure 11:
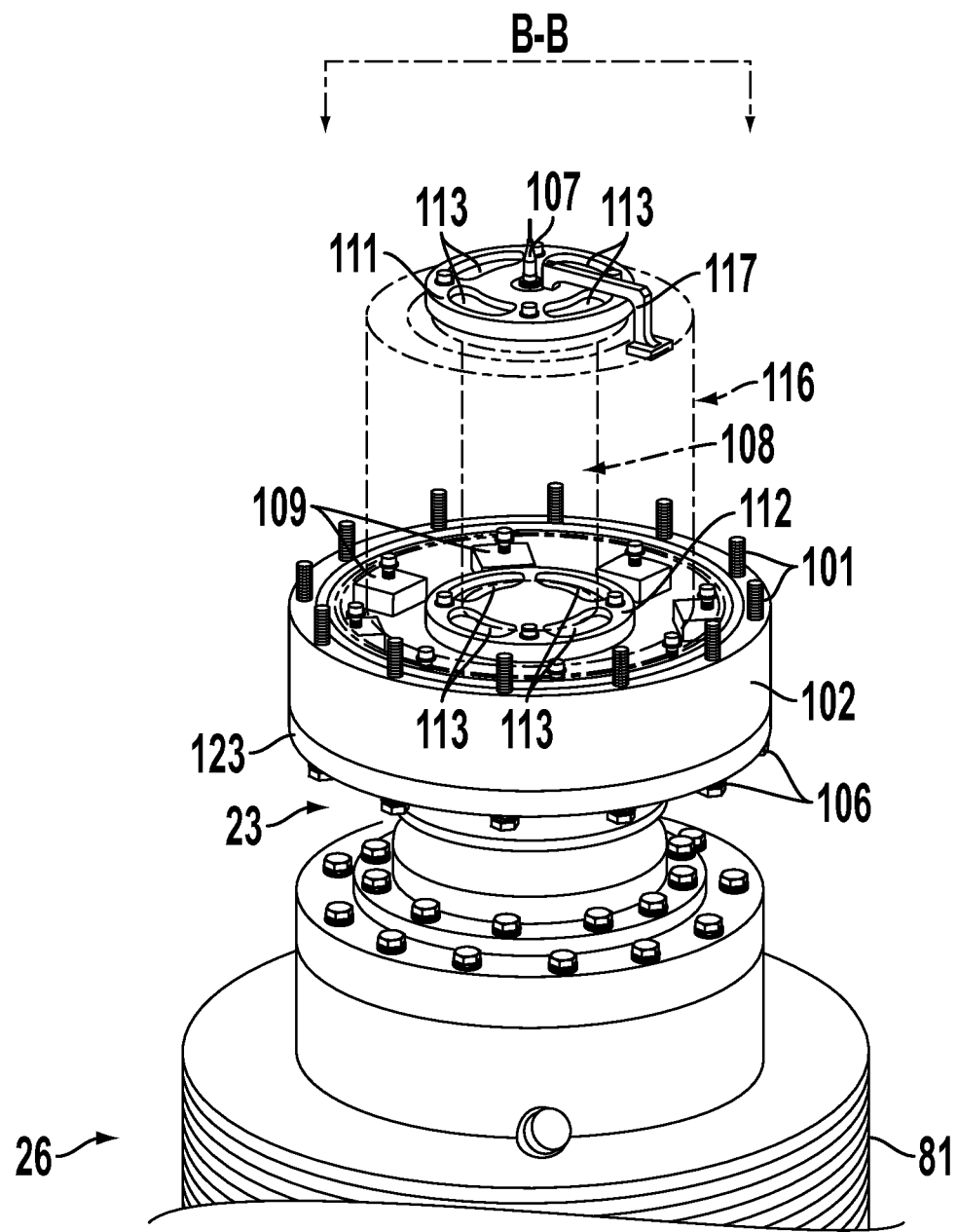
FIG. 11 is a perspective view of the fiber optic data transmission channel extending through the center of the slip ring canister assembly in a mated position relative to the azimuthal drive assembly.

Magnified view FIG. 11 shows a fiber optic rotary joint 107 positioned and supported by rotary joint capsule 116. Rotary joint capsule 116 includes a single channel slip ring assembly 108 supported by a rotor support ring 111 (top) and a stator support ring 112 (bottom), each including a least 4 conductor openings 113 through which wires (not shown) may enter and exit from conductors positioned on the top and bottom of the slip ring assembly 108. Typically, flying-lead style wires are connected to the top and bottom conductors on slip ring 108 to allow power to be provided to components above the azimuthal joint 23 and elevational command signals to drive actuator 78. Fiber optic rotary joint ("FORJ") 107 is preferably a single pass multi-mode type, as for example model No. 286 manufactured by Focal Technologies Corporation of Canada. As can be seen, slip ring 108 should be a through-bore variety such as that made by Moog Components Group, based in Blacksburg, Va. under part No. AC6275, or similar, so that fiber optic line (not shown) connected to non-rotational (lower) portion of FORJ 107 may traverse through the center of the slip ring 108 and down through rotational actuator assembly 121 along vertical axis 125 (see FIG. 12). A de-rotation bracket 117 bears against a torque arm integrally formed into a mounting disk surrounding and supporting FORJ 107 so that the upper portion of FORJ 107 is held in rotational and locked alignment with canister 116 and other rotating assemblies such as antenna 11 and super structure 17.

Figure 12:
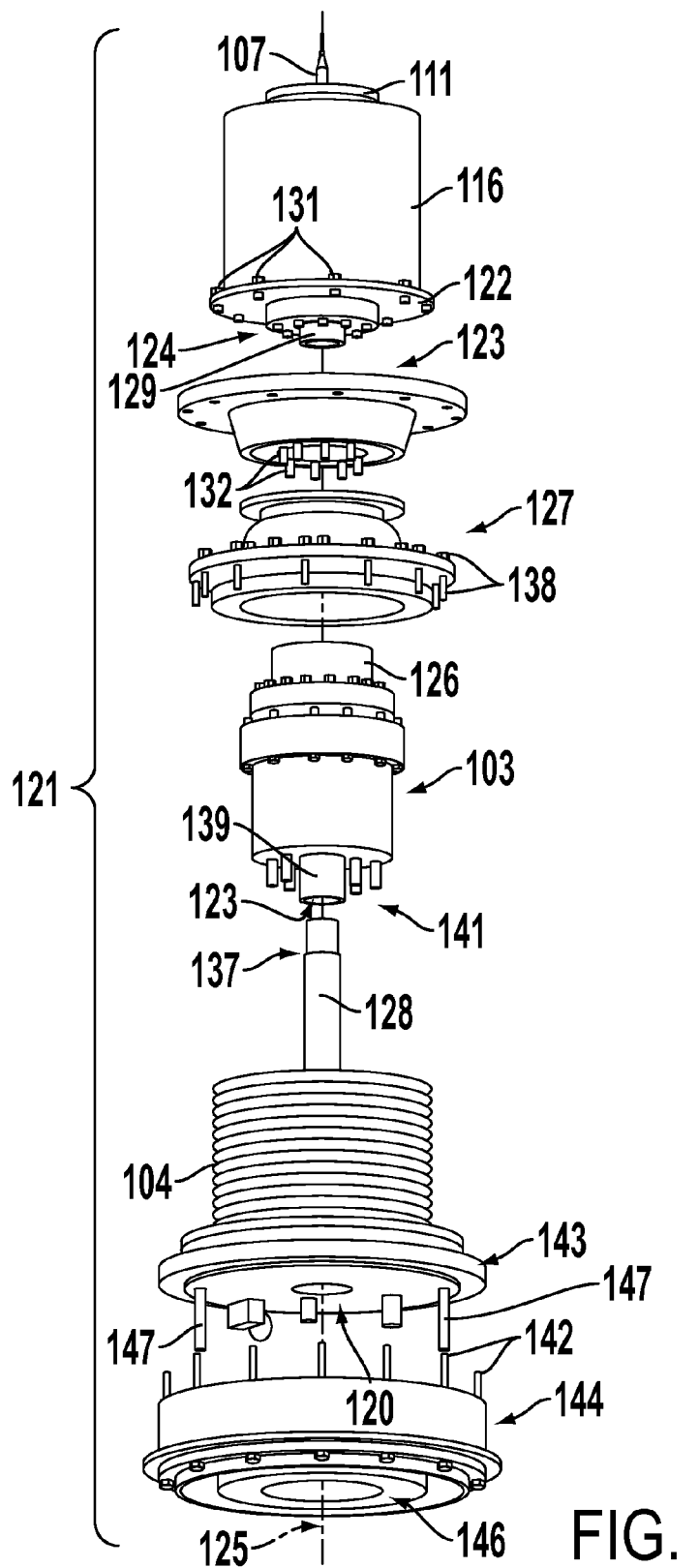
FIG. 12 is an exploded perspective view of the azimuthal drive assembly with the cover removed.
Figure 13:
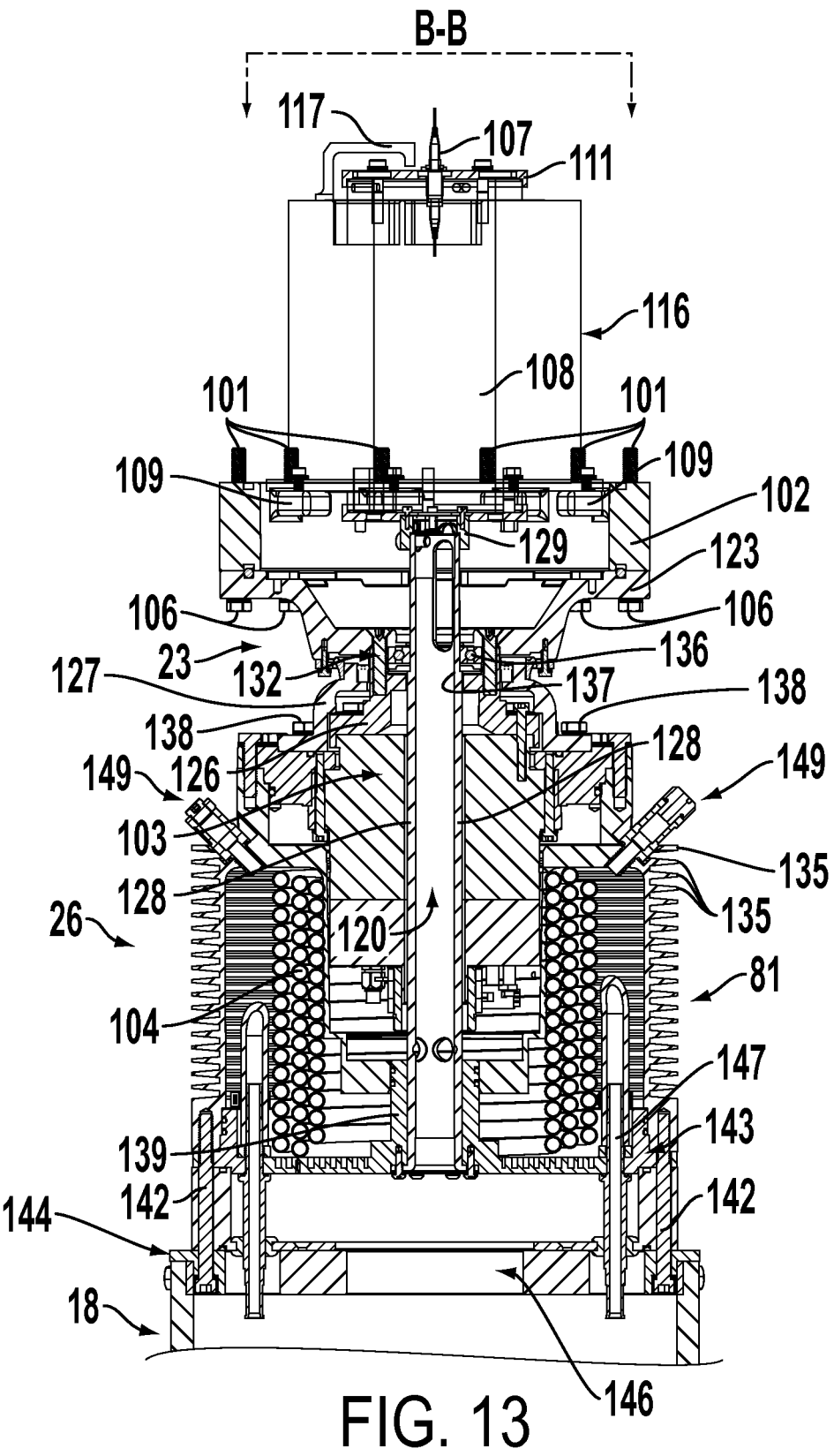
FIG. 13 is vertical section view taken along lines B-B in FIG. 11 of the azimuthal drive assembly.

Referring now to FIGS. 12 and 13, slip ring canister 116 includes a mounting plate 122 affixed to its lower surface which bears against and is affixed to turntable 123 with bolts 131. Output end cap 127 is affixed to rotational drive assembly case 81 with bolts 138, and includes several gaskets and seals to isolate the interior of drive assembly 26 from the environment. Turntable 123 has a lower end that extends through output end cap 127 to mate with output drive hub 126, which is rotationally affixed to actuator 103 at its flexspline. As with the elevational drive assembly 20, drive actuator 103 preferably consists of a hollow shaft, strain wave actuator, such a harmonic drive offered by Harmonic Drive Technologies located in Boston, Mass. under their SHA model series. Sensors on the interior of the drive actuator 103 (not shown), monitor the drive shaft rotation speed, direction, and angular position so that precise control of the output shaft may be accomplished with controller electronics located within pedestal 18 or an adjacent electronics cabinet (not shown) attached to access way 84, or in center compartment 40 in superstructure 17. Rotational drive includes a hollow center 120 that receives riser 128 that extends through center 120 and mates with riser receiver 129. The bottom of hollow center 120 includes a guide cylinder 139 and support hardware 141 to support and affix actuator 103 onto jacket support assembly 143. Jacket support assembly also houses cooling jacket 104, which consists of a coiled column of copper tubes that surround and cool actuator 103 as coolant fluid flows through the coil. Jacket support assembly 143 includes fittings for connection to the copper coil and for affixing drive unit 103 to the support assembly 143. Assembly 143 also includes guide pins 147 that lock assembly 143 into base 144 and resist rotation. Base 144 also includes guide aperture 146 that provides an opening for wires and cables, such as a fiber optic cable to traverse base 144 and into the interior of pedestal 18.

Turning specifically now to FIG. 13, it may be seen that a bearing 136 is seated on output cap 127 and held in place by flange 135 formed in riser 128. The bearing keeps riser tube 128 in static alignment with the non-rotational lower portion of slip ring 108, while allowing output hub 126 and bolted turntable to 123 to freely rotate around riser 128. Output hub 126 is supported by a bearing (not shown) internal to actuator 103 which is supported by the case of actuator 103. The case of actuator 103 is in turn supported by support assembly 143 which is supported by pedestal 18. Hence, turntable 123, output hub 126, and the case of the actuator 103 support the entire upper portion of the radar 10 during rotation of output hub 126 and turntable 123. But, since actuator 103 is hollow, riser 128 provides a hollow conduit through which an optical communications cable connected to non-rotating lower end of FORJ 107 may pass down through lower aperture 146 and into pedestal 18 where it can connect with electronics inside the pedestal. Electrical conductors (not shown) connected to non-rotating lower portion of slip ring 108 may also pass freely through riser 128 into pedestal 18.

Rotational drive case 81 is formed with a plurality of cooling fins 135 on its surface to assist cooling jacket 104 in dissipating heat from drive actuator 103, and for holding two valves 149. These valves 149 are rotational seated in and extend through case 81 and into the interior of assembly 26. The vales provide a pressure release aperture if the internal pressure due to internal heat inside the assembly 26 reaches a predetermined limit and needs to be released. The valves may also be rotationally removed so that coolant fluid may be added to the cooling jacket reservoir, should the cooper coil tubing be upgraded to a full reservoir design as mentioned previously for jacket 79 in the elevational assembly 20.

Figure 14A:
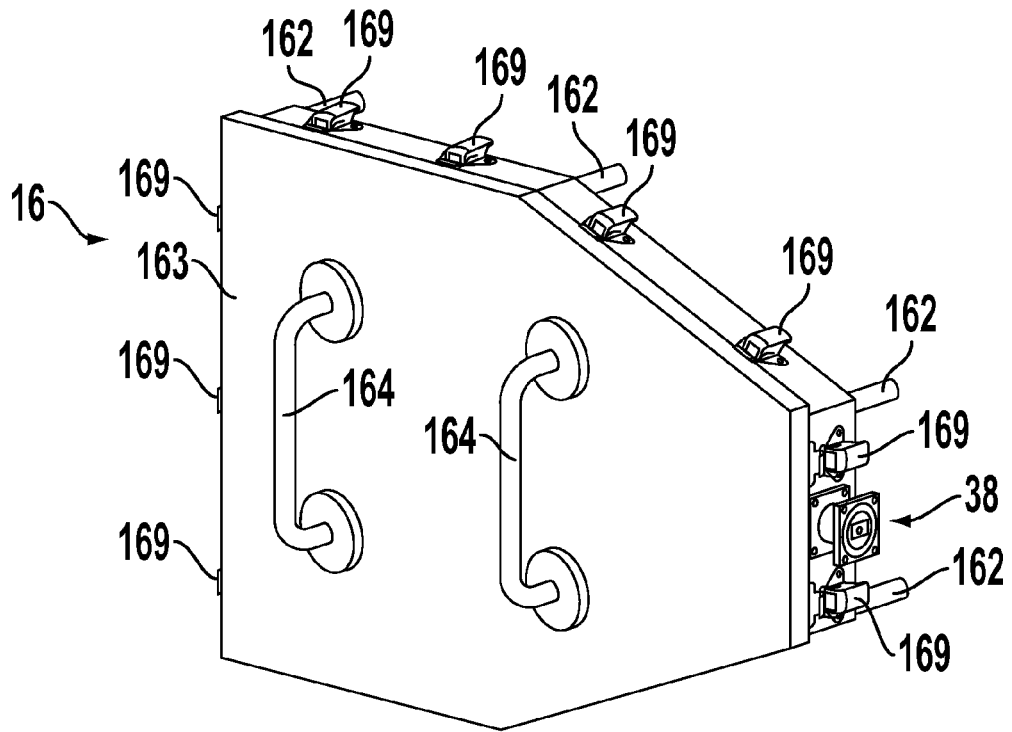
FIGS. 14A and 14B are perspective views of the radar transceiver, with 14B showing the transceiver with its maintenance cover removed.
Figure 14B:
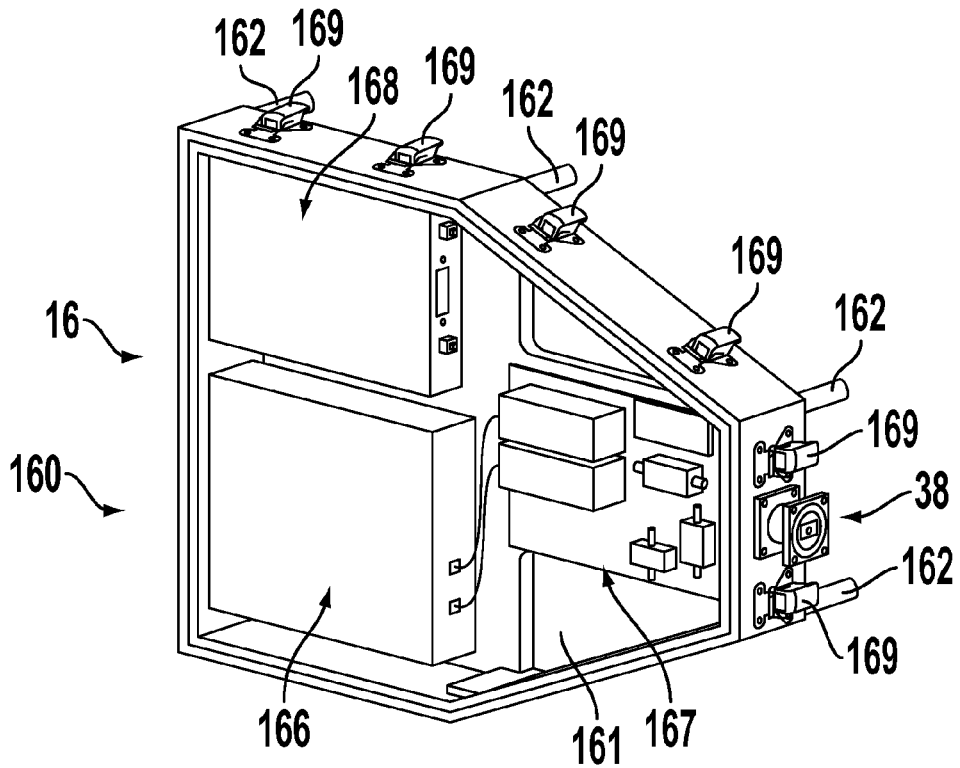

Referring now to FIGS. 14A-14B, saddlebag compartment 16 includes a transceiver electronics assembly 160 in an electronics compartment or bay 161. The bay 161 accepts a cover 163 which is secured to it with a plurality of latches 169 and a sealing gasket. When cover is position over compartment 161 with latches 169, compartment 161 is protected and isolated from the environment. Bay 161 may be affixed to superstructure side panels 25 with bolts 162, but a rear electronics communications port (not shown) provides an access pathway from the rear surface of bay 161 into the depending side panels 25 so that one or more fiber optic communications cables and high-speed data and power cabling may extend from transceiver assembly 160 and into elevational assembly 20. As previously discussed, elevational joints 22 and 22' are attached to side panels 25 at attachment point 42, each of which has hollow spaces through which such communications and power lines may travel without experiencing rotational torsion. Rotational joint 116 and FORJ 107 further provide for such communications and power lines to traverse through rotational assembly 26 and into pedestal 18.

Bay 160 holds a power supply 168, a radar transmitter 167, and a radar receiver 166. Wave guide port 38 bolts onto rear wave guide 15 so that radio frequency transmissions from transmitter 167 may be propagated to antenna 11, and radar reflectivity signals received and processed by receiver 166. Further discussions regarding the operation and workings of the electronics in transceiver assembly 160 are omitted as such components are commercially available and not necessary for a complete understanding of the herein described invention.

Figure 15:
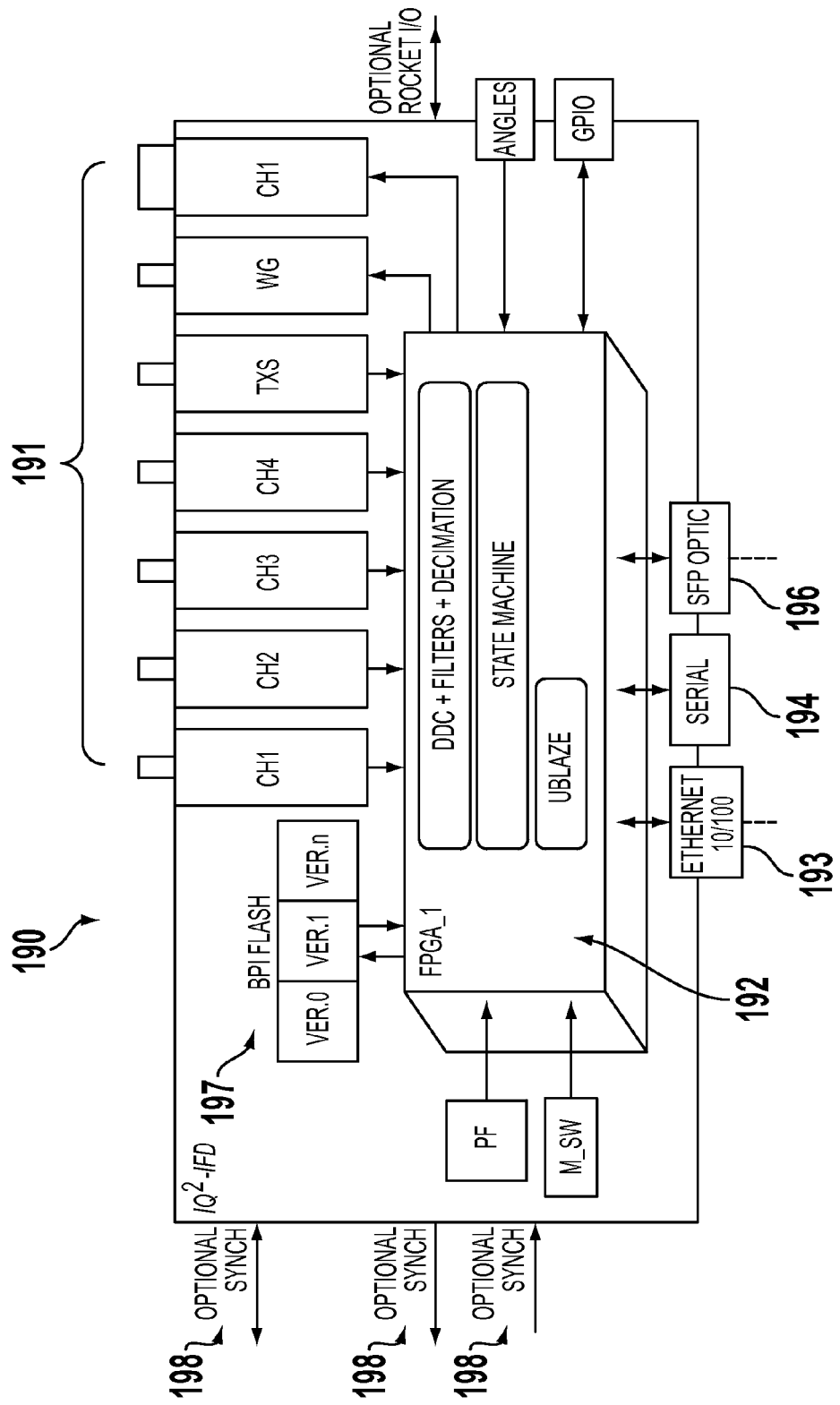
FIG. 15 is a component schematic of the intermediate frequency digitizer located within the elevational drive assembly; and, FIG. 16 is a functional schematic of the major electrical components in the radar.

Referring to FIG. 15, an intermediate frequency digitizer ("IFD") 190 is preferably housed in center compartment 40 of superstructure 17 and cooled by liquid coolant in tubing positioned adjacent to the IFD. Actuation of pump 34 to move fluid to heat exchanger 29 is controlled by thermostats housed in angled compartments 40 to the side of the center compartment 40. Alternatively the IFD might be mounted to the interior side of elevational assembly 20 covers 57, thereby taking advantage of the proximal cooling assemblies. For example, IFD 190 might be affixed to one of the access plates 57 on the interior cooling transfer surface so that heat generated by the IFD may be easily removed by an adjacent cooling assembly 29. The IFD 190 may be affixed to plate 57 in any conventional manner, as is known in the art.

The main purpose of the IFD 190 is to digitize the analog intermediate frequency ("IF") signals from receivers 160 with a minimum of computational effort. The IFD 190 includes circuitry which converts the signals reaching the radar receiver into filtered and digitized quadrature I/Q data streams. This is a critical function in the radar and the IFD is optimized with regard to dynamic range, linearity, range resolution, passband flexibility, and data throughput for each radar depending upon a number of operational factors, such as what transmission frequency is used by the radar. Functions sometimes reserved for a digital receiver such as obtaining I, Q and Burst Pulse statistics, are preferably performed on the IFD 190 and would include matched-filtering and the extraction of dynamic "I" and "Q" values for the receiver. Further, the IFD analyzes the burst pulse in the radar with respect to frequency, phase and amplitude to provide digital phase locking, AFC, and advanced processing and control.

The IFD 190 includes a 16-bit high-speed digitizer 192 in an FPGA that digitizes received horizontal and vertical radar returns at an intermediate frequency of 60 MHz. The IF signals are sampled with 16-bit precision, at a rate dependent upon the type of transmission sent by the radar. Typically the sampling rate is about 76.7239 MHz, which is preferable to make the range gates fit rationally into 1-Km, but optionally other sampling frequencies up to 100 MHz may be provided. The IF signals are normally filtered by a three-pole filter for 60 MHz IF applications prior to digitization, but other IF frequencies, or even wide-band operation, can be provided over a range of from 10 to 170 MHz.

After conversion to the digital domain, the digital horizontal and vertical I/Q data are sent from the IFD 190 to a signal processor and host computer via a fiber optic cable 187 located below rotational joint 23, and typically inside the pedestal 18 or in a closely located computer cabinet (not shown). There are five IF inputs 191 to the IFD 190: CH1-CH4 and TXS. Typically, the channels 1-4 are used in pairs, one pair for horizontal receiver, and one pair for the vertical receiver, with each pair receiving intermediate signals having overlapping dynamic range, which will provide a system dynamic range greater than that achievable with a single A/D converter. The TXS IF channel is used to sample the transmitter output waveform (for both incoherent and driven transmitters), so that the received signals can be corrected for the transmitter phase and amplitude on a pulse-by-pulse basis. This digital COHO function is typically accurate to 0.02 degrees.

The digitized IF signals are converted to baseband I/Q data using a tunable digital local oscillator 176, and processed through digital filters to establish an acceptable IF passband shape and range-gate resolution. The digital IF signals are then passed out of IFD ports (193, 194, 196) to the aforementioned digital processing unit along a 2.5 Gbits/sec. optical cable with command/control/status information being provided by a gigabit Ethernet cable. The unit is provided with nine fully programmable triggers, serial angle input ports, and other I/O ports which can be used for special applications. Optional synchronization signals 198 are also usable by the IFD.

Figure 16:
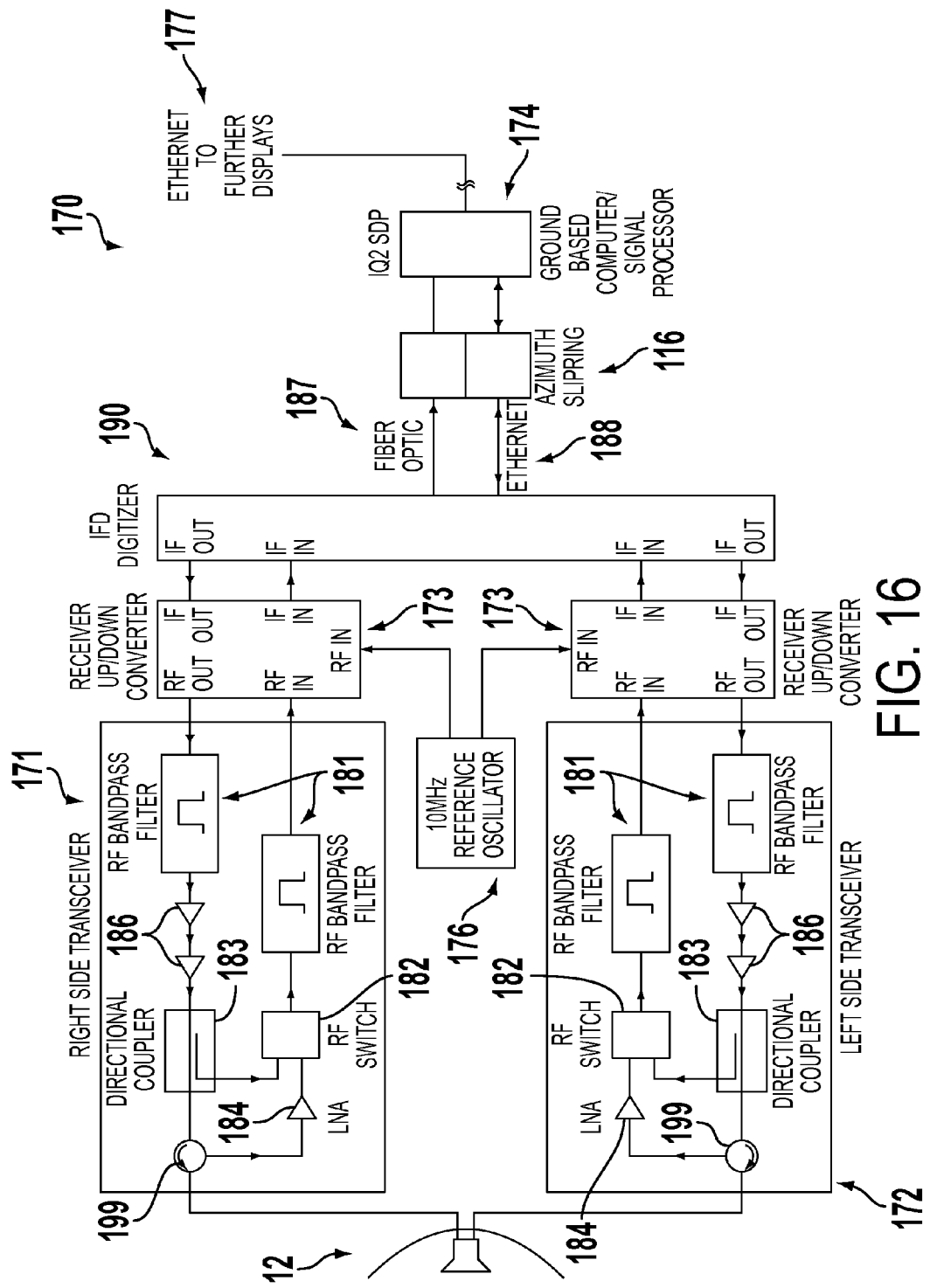

Referring now to FIG. 16, it can be seen that the IFD 190 is functionally positioned between a pair of transceivers 171 and 172, positioned in bays 161 as discussed previously, and ground based signal processing electronics 174. Typically, one transceiver transmits horizontal radio frequency signals and receives horizontal radio frequency reflectivity data collected by antenna 11 and orthomode feed horn 12, and the other transmits and receives vertical signals in like manner. An up/down converter 173 converts signals either up or down to an intermediate frequency that may then be digitized by IFD 190. A reference signal from a reference oscillator 176 governs the conversion process in the converter 173. Once digitized, one or more fiber optic cables 187 and Ethernet cables 188 transmit data through azimuth slip ring assembly 116 to ground based processing equipment 174, or to other remote client computers 177.

Each transceiver 171, 172 includes band pass filters 181, various matched amplifiers 186, such as power amplifiers, and directional couplers 183. Radio frequency switches 182 control the amount of transmission power that may be transmitted for either the horizontal or vertical transmission channels, and circulators 199 protect and isolate transmission power from the components in the receiver that collect reflectivity signals to prevent damage to the components. A low noise amplifier 184 receives radar reflectivity signals propagated through the waveguide tubes 14, 15 from antenna 11 and converts those signals into electrical signals that can be transferred by a coaxial cable to other receiver elements.

Radar 10 includes signal processing electronics held by pedestal 18 to process radar reflectivity data and to provide movement control for the drive actuators in the azimuthal and elevation assemblies. Such processing electronics may be held in an axillary electronics, environmentally isolated NEMA style compartment affixed to the maintenance access way 84 on the exterior of pedestal 18. Further cabinets may also be connected to and mounted adjacent to pedestal base 28, as needed. While the current embodiment of the herein described radar 10 positions radar signal processing in or on the pedestal 18, the inventors contemplate the integration of such electronics in or on the frame superstructure 17, in or in electronics compartments 16, or held within elevational drive assembly 20 as such electronics are shrunk over time.

In operation, the radar 10 transmits X-band radar waves simultaneously through each waveguide 14-15 in each plane of transmission, and then may receive reflectivity signals through each waveguide 14-15. Transmission occurs from transmitters in transceivers 171 and 172, and reflectivity signals are processed by the receiver elements in each transceiver. Digitized reflectivity signals are transferred via a fiber optic cable 187 down through the transfer case 20 and rotational drive assembly to one or more signal processors inside the pedestal 18 or held in processing cards of off-pedestal workstations (not shown). As previously shown, the FORJ is positioned within the center of the rotational drive assembly to allow the upper portion of the optical fiber to rotate freely relative to the lower portion of the FORJ. The aforementioned radar configuration allows for direct transmission of digitized reflectivity data to signal processors without the distortion caused by the usage of slip rings to transmit reflectivity data through the elevational and rotational joints, thereby preserving reflectivity data that permits superior weather data analysis.

While the invention has been shown in one form, it will be obvious to those skilled in the art that it is not so limited but is susceptible of various changes and modifications without departing from the spirit thereof.

The invention claimed is:

1. A Doppler weather radar having anti-backslash movement, comprising:
  a. a pedestal for supporting said radar;
  b. a rotational assembly supported by said pedestal and adapted for continuous 360 degree rotation, said rotational assembly including a rotational axis, and wherein said rotational assembly further comprises a harmonic drive assembly including a harmonic drive actuator for driving rotation thereof, and wherein said harmonic drive actuator includes a rotational axis co-extensive with said rotational assembly rotational axis, and wherein said harmonic drive assembly and harmonic drive actuator define a bore through said harmonic drive assembly co-extensive with said rotational assembly rotational axis, and wherein said bore is adapted to permit the traversing of electrical wires therethrough;
  c. an elevational assembly rotationally supported by said rotational assembly and rotationally driven by said harmonic drive actuator, said elevational assembly including two axially aligned elevational joints mounted on opposite sides of said elevational assembly, and wherein said harmonic drive assembly is adapted to exclude rotational backlash upon rotation thereof;
  d. a frame superstructure rotationally supported by and spanning said elevational joints about said elevational assembly, said frame superstructure including a separate antenna mounting frame spanning said elevational assembly; and, e. a parabolic antenna assembly mounted on said antenna mounting frame having an orthomode feed horn and at least one waveguide assembly connected to said orthomode feed horn for bidirectional communications with a transceiver assembly.

2. A radar as recited in claim 1, further including a harmonic drive in one of said elevational joints such that rotation of said harmonic drive elevates said antenna assembly.

3. A radar as recited in claim 2, further comprising a slip ring assembly positioned in a lower portion of said elevational assembly and operationally connected to said harmonic drive actuator in said rotational assembly.

4. A radar as recited in claim 3, wherein one of said elevational joint comprises an output hub operationally connected to a rotating output of said harmonic drive actuator, a support plate, and an end cap, wherein said output hub is rotationally held between said support plate and said end cap, and wherein a portion of said output hub extends through said end cap for connecting same to said frame superstructure, and wherein said support plate holds said harmonic drive actuator and is affixed to said elevational drive assembly at a lateral position thereof.

5. A radar as recited in claim 4, wherein said rotational assembly includes a cooling assembly surrounding said harmonic drive actuator for cooling of same.

6. A radar as recited in claim 5, wherein said one of said elevational joints defines a hollow cylinder coextensive with the rotational axis of said elevational joint allowing for the passage of electronic cables therethrough.

7. A radar as recited in claim 5, wherein said rotational joint hollow cylinder includes the positioning of at least one electronic cable within said cylinder such that the rotation of said elevational joint does not disturb the rotational alignment of said at least one electronic cable.

8. A radar as recited in claim 1, wherein said rotational assembly further comprises a case surrounding said rotational assembly and supported by said pedestal, and wherein said rotational assembly further comprises an output cap having a lower circumferential flange affixed to an upper edge of said case, an output hub rotationally fixed to an output portion of said harmonic drive actuator and extending through said output cap, and a turntable having an upper surface supporting said elevational assembly and a lower portion affixed to said output hub.

9. A radar as recited in claim 8, wherein said rotational assembly defines a hollow cylinder coextensive with the rotational axis of said rotational assembly and allows for the passage of electronic cables therethrough.

10. A radar as recited in claim 9, wherein said one of said elevational joints defines a hollow cylinder coextensive with the rotational axis of said elevational joint allowing for the passage of electronic cables therethrough.

11. A radar as recited in claim 10, wherein said rotational assembly is capable of 360 degree rotation.

12. A radar as recited in claim 1, wherein said rotational assembly further comprises a case supported by said pedestal, said harmonic drive actuator having a portion of its case affixed to said rotational assembly case and being supported thereof, and wherein said rotational assembly further defines a hollow cylinder extending along its rotational axis, said rotational assembly including a riser affixed to a lower portion of said rotational assembly and extending through said hollow cylinder and into said elevational assembly.

13. A Doppler weather radar system, comprising:

a. means for providing a pedestal to support said radar system;

b. antenna assembly means for bidirectional radar communications with a radar receiver, said antenna assembly means including means for orthogonal wave transmissions toward weather phenomenon of interest and further including means for waveguide bidirectional communications with a radar transceiver;

c. assembly means supported by said pedestal means for rotating said antenna assembly means, said rotation assembly means adapted for continuous 360 degree rotation and including a harmonic drive assembly having a harmonic drive actuator, and wherein said rotational assembly means and said harmonic drive assembly are rotational coaxial, and wherein said harmonic drive assembly and said harmonic drive actuator define a coaxial bore through said harmonic drive assembly coextensive with said rotational assembly means;

d. means rotationally supported by said rotation assembly means for declining and inclining upwards said antenna assembly means, wherein said rotational assembly means is adapted to prohibit rotational backlash of said declining and inclining means upon rotation thereof;

e. means for providing a frame superstructure for supporting said antenna assembly means on said declining and inclining means, wherein said frame means further includes mounting means for connecting said antenna assembly means to said frame means, and wherein said mounting means spans said declining and inclining means; and, f. wherein said inclining and declining means further includes means for rotationally joining said antenna assembly means to said frame means.

14. A radar as recited in claim 13, further including a harmonic drive within said rotational joining means for causing movement of said frame means.

15. A radar as recited in claim 14, wherein said rotational means further comprises a case supported by said pedestal means, and wherein said rotation means further comprises an output cap having a lower circumferential flange affixed to an upper edge of said case, an output hub rotationally fixed to an output portion of said harmonic drive actuator and extending through said output cap, and a turntable having an upper surface supporting said declining and inclining means and a lower portion affixed to said output hub.

16. A radar as recited in claim 15, wherein said bore comprises a vertical cylinder having a cylindrical wall for separating wires running therethrough from contacting the interior space of said.

17. A radar as recited in claim 16, wherein said rotational joining means further comprises an output hub operationally connected to a rotating output of said harmonic drive actuator, and wherein said rotational joining means includes a support plate and an end cap holding said output, and wherein a portion of said output hub extends through said end cap for connecting same to said frame means, wherein said support plate holds said harmonic drive and is bolted to said declining and inclining means at a lateral position thereof.

18. A radar as recited in claim 16, further comprising a slip ring assembly positioned in a lower portion of said declining and inclining means and operationally connected to said harmonic drive actuator in said rotational means, and wherein said rotation means further includes electronic cables having one end in electrical contact with said slip ring assembly at a lower non-rotating portion thereof relative to said rotation means, and the remainder of said cable extending through said hollow cylinder of said rotation means and into said pedestal means.

19. In a Doppler weather radar system, said radar having a pedestal, a rotational assembly supported by said pedestal, an elevational assembly rotationally supported by said rotational assembly, a frame superstructure rotationally supported by and spanning said elevational joints about said elevational assembly, and a parabolic antenna assembly mounted on said frame superstructure frame having an orthomode feed horn and at least one waveguide assembly connected to said orthomode feed horn for bidirectional communications with a transceiver assembly, a method of positioning said antenna assembly without backlash, comprising the steps of:
  a. continuously rotating an output hub greater than 360 degrees with a harmonic drive actuator positioned on said elevational assembly, wherein said output hub is rotationally connected to frame superstructure such the rotation of said output hub causes declining and raising of said antenna assembly;
  b. rotating an output hub supporting said elevational assembly with a harmonic drive actuator positioned within said rotational assembly, wherein the rotational axis of said harmonic drive actuator and the rotational axis of said rotational assembly are identical while rotating said elevational assembly; and,
  c. varying steps a-b responsive to preprogrammed settings such that said antenna assembly transits the sky to obtain weather reflectivity data for a predetermined portion of the sky without backlash movement.

20. The method as recited in claim 19, further including the step of passing digitized data through a cable positioned at the axial center of said harmonic drive positioned in said rotational assembly.

21. The method as recited in claim 20, wherein said cable comprises an optical fiber.

22. The method as recited in claim 20, further including passing electrical signals through a slip ring assembly positioned within said elevational assembly, wherein said axis of said slip ring assembly is identical to the rotational axis of said harmonic drive actuator during rotation thereof.

23. The method as recited in claim 22, further including the step of passing optical data signals though a fiber optic rotary joint supported by said slip ring assembly.

24. An anti-backlash Doppler weather radar, comprising:
  a. a pedestal for supporting said radar, said pedestal having a radial base at a lower end thereof and a hollow interior for holding electronics;
  b. a rotational assembly supported by said pedestal and adapted for continuous 360 degree rotation, said rotational assembly including a case and a harmonic drive assembly spanning the interior of said case, said assembly having a vertical axis of rotation, said harmonic drive assembly including a harmonic drive actuator positioned such that the rotation axis of said harmonic drive actuator is identical to the rotation axis of said harmonic drive assembly;
  c. an elevational assembly rotationally supported on said rotational assembly, said elevational assembly including at least one elevational joint affixed to the exterior of said elevational assembly, wherein said joint defines an empty cylinder extending along its rotational axis and into the interior of said elevational assembly;
  d. a frame superstructure having at least one depending panel, wherein said frame superstructure is rotationally supported at said depending panel by said at least one elevational joint, and wherein said frame superstructure includes a separate antenna mounting frame spanning said elevational assembly; and,
  e. a parabolic antenna assembly mounted on said antenna mounting frame having an orthomode feed horn and at least one waveguide assembly connected to said orthomode feed horn for bidirectional communications with a transceiver assembly.

25. A radar as recited in claim 24, further including a harmonic drive in one of said elevational joints, wherein the axis of rotation of said elevational joint and said harmonic drive in said elevational joint are identical such that rotation of an output element in said harmonic drive elevates or declines said antenna assembly responsive to the rotation direction of said harmonic drive element in said elevational joint.

26. A radar as recited in claim 25, wherein said rotational assembly further comprises an output cap having a lower circumferential flange affixed to an upper edge of said case, an output hub rotationally fixed to an output portion of said harmonic drive actuator and extending through said output cap, and a turntable having an upper surface supporting said elevational assembly and a lower portion affixed to said output hub.

27. A radar as recited in claim 26, wherein said harmonic drive actuator has a portion of its case affixed to said rotational assembly case and being supported thereof, and wherein said rotational assembly further defines a hollow cylinder extending along its rotational axis, said rotational assembly including a riser affixed to a lower portion of said rotational assembly and extending through said harmonic drive actuator and into said elevational assembly.

28. A radar as recited in claim 26, wherein said elevational joint further comprises an output hub operationally connected to a rotating output of said harmonic drive actuator, and wherein said elevational joint includes a support plate and an end cap holding said output, and wherein a portion of said output hub extends through said end cap for connecting same to said frame, wherein said support plate holds said harmonic drive actuator and is bolted to said elevational assembly at a lateral position thereof.

29. A radar having anti-backlash antenna movements, comprising:
  a. a pedestal for supporting said radar;
  b. a rotational assembly supported by said pedestal and adapted for continuous 360 degree rotation, said rotational assembly including a rotational platter extending upwards from said rotational assembly;
  c. a harmonic drive assembly having a hollow center and a rotational axis axially aligned with the rotational axis of said rotational platter and the rotational axis of said rotational assembly, said harmonic drive including a flexspline member for outputting rotational motion, wherein said flexspline member is rotationally coupled to said rotational platter;
  d. an elevational drive assembly affixed to and supported by said rotational platter;
  e. a slip ring assembly positioned above said platter and operationally coupled thereto, said slip ring assembly including electrical cabling extending downward from a non-rotational portion of said slip ring assembly relative to pedestal and through the axial center of said harmonic drive, said slip ring assembly having a rotational axis identical to said rotational assembly;
  f. an antenna assembly;
  g. a frame assembly for supporting said antenna assembly on said elevational assembly; and, h. wherein said elevational drive includes a harmonic drive for elevating and declining said frame assembly, said elevational harmonic drive having a rotation axis identical with the rotation axis of said frame assembly during inclining and declining movement thereof.

* * * * *

UNITED STATES PATENT AND TRADEMARK OFFICE
CERTIFICATE OF CORRECTION

| | | |
|---|---|---|
| PATENT NO. | : 9,322,912 B2 | Page 1 of 1 |
| APPLICATION NO. | : 13/655443 | |
| DATED | : April 26, 2016 | |
| INVENTOR(S) | : Knight et al. | |

It is certified that error appears in the above-identified patent and that said Letters Patent is hereby corrected as shown below:

Title Page, item (71) the Applicant(s) listing in the Issuance Notification currently reading:

Michael Bruce Knight, Enterprise, AL;
John Charles Fanning, Enterprise, AL;
James Rogers Helvin, Ozark, AL;
Mark Alan Jones, Daleville, AL;
Norman Edwin Lawrence III, Enterprise, AL;
Damon Schmidt, Largo, FL;

Should appear as follows:

ENTERPRISE ELECTRONICS CORPORATION, Enterprise, AL

Signed and Sealed this
Seventh Day of June, 2016

Michelle K. Lee
*Director of the United States Patent and Trademark Office*